United States Patent Office 2,768,338
Patented Oct. 23, 1956

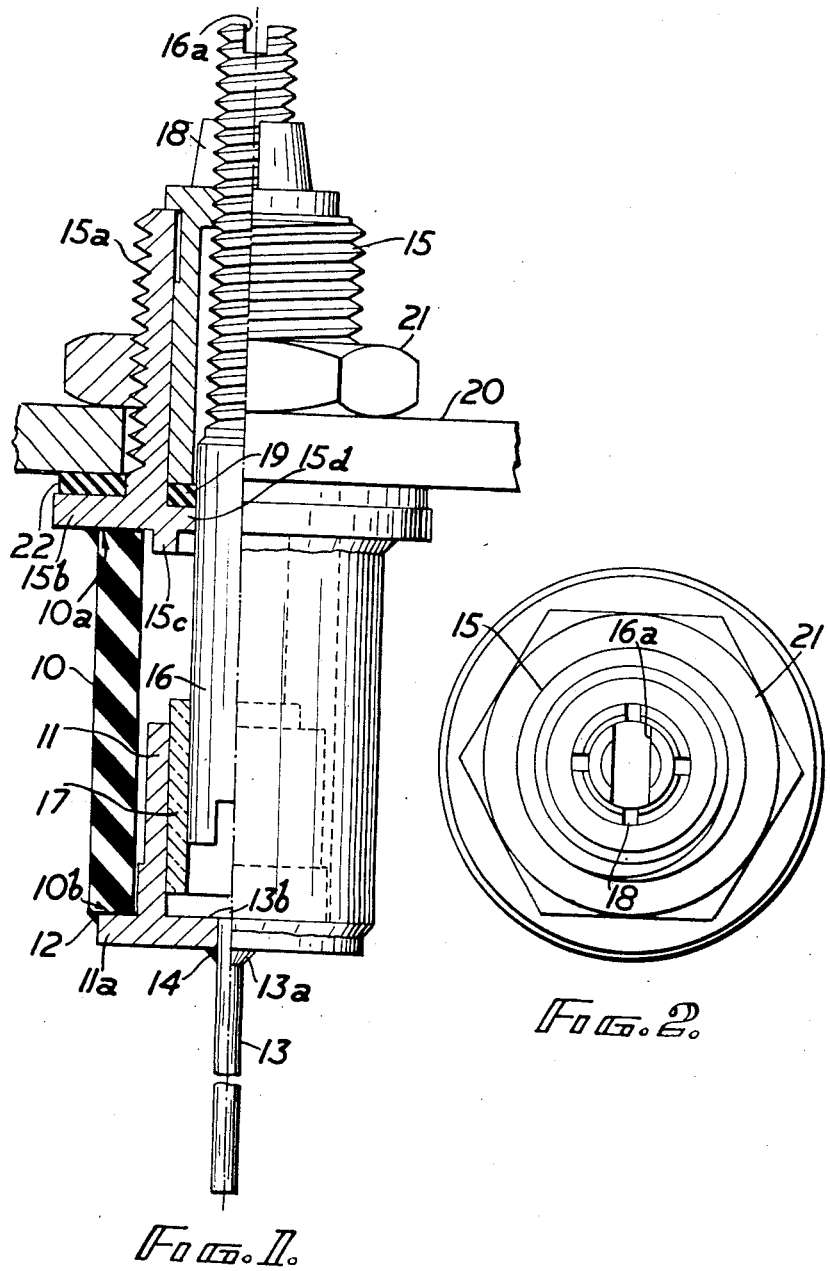

2,768,338

ELECTRIC VARIABLE CONDENSERS

Cyril Roger Williams, Gorleston-on-Sea, George Girdley Blowers, Great Yarmouth, and Frank Alfred Evans, Gorleston-on-Sea, England, assignors to Erie Resistor Limited, Great Yarmouth, England, a British company Application March 8, 1952, Serial No. 275,536

Claims priority, application Great Britain, March 9, 1951

3 Claims. (Cl. 317—249)

This invention relates to electric variable condensers such as may be used for adjusting the frequency of radio frequency tuned circuits, more especially to so-called trimming condensers, and the invention has for its object to provide a construction of such condenser which can be sealed against the atmosphere or against the entry of moisture or other liquids.

In accordance with the invention there is provided a closed casing, a cylindrical electrode fixed with respect to said casing, a second cylindrical electrode in said casing movable with respect to said first electrode by adjusting means extending through a wall of said casing and a sealing device between said means and said casing.

Further features and advantages of the invention will be apparent from the following description of one embodiment of the invention, as applied to a trimming condenser for a radio or like apparatus, and having a relatively small capacitance, in conjunction with the accompanying drawing in which Figure 1 is a side elevation, half in section, of the condenser mounted upon a support such as the metal chassis or panel of an electrical apparatus, and Figure 2 is a plan view of the same condenser, removed from the chassis.

Briefly this condenser comprises a casing formed by an insulating tube, closed at one end by a terminal plug, carrying a cylindrical cup shaped fixed electrode, and at the other end by a bush member. The moving electrode, also cylindrical, is mounted in the bush member and is axially adjustable by a screw thread; the moving electrode can be thereby made to enter, more or less, the fixed electrode, whereby the capacity between the electrodes can be varied. An insulating dielectric sleeve is provided between the two electrodes, and a seal is provided in the bush member between the relatively moving parts therein.

Describing now the construction of the condenser in rather more detail, the casing is formed partly by a tube 10 of heat resisting glass or ceramic and of circular cross section. Before assembly, the ends of the tube, especially the end faces 10a and 10b, are silvered and lightly tinned in known manner. In this particular embodiment this tube is roughly half an inch long and half an inch in diameter.

At its one end this tube is closed by a cylindrical, cup shaped plated brass terminal 11 having an outwardly extending disc or flange 11a at its closed end. The end wall 10b of the tube 10 engages this flange, with the cup portion of the terminal lying within the tube; the tube and the terminal flange are secured together by solder at 12, providing a hermetic closed connection between the surfaces. This brass terminal forms one electrode of the condenser and is accordingly fitted with electrical connection means, such as a wire 13 soldered thereto at 14. It is preferred to form a shoulder 13a on the wire before it is inserted in the opening provided in the terminal, and to deform the end of the wire at 13b after insertion, in order to ensure that the wire does not fracture in use, or does not break the hermetic seal at the point of attachment.

To the other end of the tube 10 is secured a bush member 15. This bush member is a sleeve, screw-threaded on its outer surface at 15a, and having at its one end an outwardly extending disc or flange 15b, like that on the terminal at the other end of the tube, and attached to the end 10a of the tube 10 in the same fashion, by soldering. With the bush member, however, the major portion lies outside the tube; a short locating flange 15c for the tube may be formed on the end face of the bush member.

At its inward end, and adjacent the flange, the bush member has a step in its inner wall, to provide a portion of reduced diameter; this forms a circular opening through which passes a brass cylinder 16 which constitutes in part the second electrode of the condenser. This brass cylinder is long enough to extend into the cup portion of the electrode 11, but the cylinder is of less diameter than the internal diameter of the cup. The brass cylinder carries a sleeve of insulating material 17 which closely fits in the space between cylinder and cup. Conveniently this sleeve is of a ceramic material, of high dielectric constant and silvered on its internal surface, so that it can be rigidly secured to the cylinder by soldering. The sleeve extends slightly beyond the end of the cylinder.

The cylinder extends through and beyond the bush member, and means are provided between these two parts whereby the cylinder can be moved axially through the bush member, by a screw thread, so as to move the cylinder into or out of the cup, whilst at the same time preserving a gas and liquid tight seal between the two parts. To achieve this a further sleeve member 18 is inserted between the bushing member and the cylinder. The external diameter of the cylinder is equal to the internal diameter of the reduced portion at the inner end of the bush member, so that along the major portion of the length of the bush member there is a space between the two parts; it is in this space that the further sleeve member 18 is located. This sleeve is a force fit in the bush member, and between the end face of this sleeve and the strip formed by the reduction in internal diameter of the bush member, is disposed a sealing washer of a resilient durable material such as synthetic rubber 19. When the sleeve is forced into the bush member this sealing washer is compressed in a substantially completely closed space and acts in the manner of a gland packing to provide a close seal between the cylinder and the bush member, despite the relative movement of those parts.

Towards its outer end, and for an axial distance at least equal to its desired axial movement, the cylinder is externally screw-threaded, this screw thread engaging a corresponding, short, internal thread at the outer end of the sleeve member. The end of the cylinder 16 projects through the bush member and through the sleeve and is provided with a screwdriver slot 16a by which the cylinder can be rotated and moved through the sleeve and hence the bush member. The inward movement of the cylinder is limited by a stop or, as shown, by the ceramic sleeve 17 engaging the base of the cup electrode 11; the outward movement is limited by the extent of the screw thread on the cylinder, or by the ceramic sleeve engaging the bush 15. In order to reduce any relative movement of the electrodes due to necessary working tolerance, and also to provide sufficient friction to retain the rod in an adjusted position, the end of the sleeve member 18 is slit by two saw cuts at right angles, as shown in Figure 2, the four parts thus formed being then bent slightly inwardly to grip the rod with light pressure.

It will be appreciated that on rotating the cylinder by means of the screwdriver slot the cylinder will move inwards or outwards causing the ceramic tube to slide within the cup of the first terminal. The capacity of the condenser is that between the silver coating applied to the ceramic tube and the cup so that increase or decrease of the overlap of one to the other will vary the capacity. By the use of a fine pitch screw small adjustments of capacity can be easily made.

The working clearance between the ceramic tube 17 and the cup of the first electrode introduces an air layer of low dielectric constant and this will cause a drop in capacity. To reduce this as far as possible it is desirable to grind the ceramic tube, concentric with the cylinder after these have been fixed together, and to such a size as to be no more than a reasonable sliding fit in the cup.

A further improvement in this respect can be obtained by forming one or more longitudinal slots in the cup of the terminal extending from the open end of the cup to or almost to, the flange, so that when the ceramic tube enters the cup the latter will fit closely on the tube without exerting undue pressure. This will eliminate the undesirable air gap to a large extent, and with it the attendant loss of capacity, and will also reduce any tendency to non-linear change of capacity with respect to rotation. The loss of capacity introduced by the slots, in reducing the electrode area, is more than offset by the increase of capacity gained by the reduction of the air gap.

Further to reduce the possibility of unwanted air gaps the dielectric tube may be coated with a film or layer of a viscous fluid, the dielectric constant of which is greater than that of air, and which may or may not contain inclusions of a higher dielectric constant. This same fluid has the additional advantage of preventing metallic contamination of the ceramic tube. The ceramic tube may also be impregnated prior to or during assembly to reduce moisture adsorption. Likewise the tube 10, after assembly can be coated with moisture resisting lacquer.

The nature of the ceramic material used for the sleeve 17 will determine to a large extent the capacity of a condenser of given design and also its temperature coefficient. For example by choice of a suitable ceramic body, the temperature coefficient may be varied between $+80$ and $-750$ parts per million per degree Centigrade. Further, by use of ceramic materials having dielectric constants, varying from 6 to 100 or more, the capacity of a given size and construction of condenser can be varied over a wide range.

The condenser described can be fitted on a panel 20 or the like by the external thread on the bush member, the bush portion proper being passed through a hole and secured by a nut 21. A sealing washer 22 can be used when so mounting the condenser, so that a hermetically sealed mounting in the panel is provided.

The choice of material for the main seal of the condenser is important. This seal is relied on to maintain the hermetic sealing of the interior of the condenser, and must do so in all conditions of temperature, pressure and humidity in which the condenser is to work; the other sealing points are at the soldered ends of the tube and, it may be, where the terminal wire is attached to the first terminal, and there is no great difficulty in maintaining permanent seals at these points. Since the sealing washer is in a completely closed space however, being the space defined by the stepped end of the bush member, the end face of the sleeve and the surface of the cylinder, it is possible to place the material of the washer under the initial compression, and thus secure a good seal.

What is claimed, is:

1. An electric variable capacitor comprising an open ended casing made of insulating material, a first closure means closing the casing one one end and having integrally formed therewith an externally threaded bush extending away from said casing end, said bush having a boring leading into the interior of said casing, said boring being formed with a first portion and a second portion of smaller diameter than the first portion, said second portion being adjacent said casing, a support means frictionally secured in said first portion of the boring, said support means having an internally threaded aperture, a movable cylindrical electrode closely fitted in said second portion of said boring and externally threaded along a portion of its length whereby it is adjustably supported in said threaded aperture, said electrode protruding to an adjustable extent into said casing, a ring of resilient material fitted in the first portion of said boring between said movable electrode and said support means closely engaging said movable electrode and compresed by said support means thereby to form an heremtic seal, a sleeve of dielectric material secured to said movable electrode for movement in unison therewith, and a second closure means closing the other open end of the casing and having integrally formed therewith an annular flange extending into the interior of said casing thereby to form a fixed second electrode having a cylindrical recess to receive said sleeve of dielectric material and said movable electrode.

2. An electric variable capacitor comprising an open ended casing made of insulating material, a first closure means closing the casing on one end and having integrally formed therewith an externally threaded bush extending away from said casing end, said bush having a boring leading into the interior of said casing, said boring being formed with a first portion and a second portion of smaller diameter than the first portion, said second portion being adjacent said casing, a support means frictionally secured in said first portion of the boring and extending into said first portion of the boring to a predetermined extent thereby to define within the bush an enclosure of predetermined size, said support means having an internally threaded aperture, a movable cylindrical electrode closely fitted in said second portion of said boring and externally threaded along a portion of its length whereby it is adjustably supported in said threaded aperture, said electrode extending to an adjustable extent into said casing, a ring of resilient material fitted in said enclosure closely engaging said movable electrode and compressed by the end of said support means in the boring thereby to form an hermetic seal, a sleeve of dielectric material secured to said movable electrode for movement in unison therewith, and a second closure means closing the other end of said casing and having integrally formed therewith an annular flange extending into the interior of said casing thereby to form a fixed second electrode having a cylindrical recess to receive said sleeve of dielectric material and said movable electrode.

3. An electric variable capacitor comprising an open ended casing made of insulating material, a first closure means closing the casing on one end, an externally threaded bush secured to said closure means extending away from said casing end, said bush having a boring communicating leading into the interior of said casing, said boring having a first portion and a second portion of smaller diameter adjacent said one end, a support means frictionally secured in said first portion of the boring, a said support means having an internally threaded aperture, a movable cylindrical electrode closely fitted in said second portion of said boring and externally threaded along a portion of its length whereby it is adjustably supported in said screw-threaded aperture, said electrode extending to an adjustable extent into said casing, a ring of resilient material fitted in said first portion of said boring between said movable electrode and said support means closely engaging said movable electrode and compressed by said support means thereby to form an hermetic seal, a stop member made of dielectric material secured to said movable electrode, and a second closure means closing the other end of said casing, said stop member being engageable with said second closure member to limit the inward movement of the electrode, and a hollow second electrode extending into the casing from the second closure means to receive said movable electrode spaced apart therefrom.

References Cited in the file of this patent

UNITED STATES PATENTS

| | | |
|---|---|---|
| 589,725 | Hodge et al. | Sept. 7, 1897 |
| 1,589,204 | Miller | June 15, 1926 |
| 1,625,698 | Barton | Apr. 19, 1927 |
| 1,768,313 | Ferguson et al. | June 25, 1930 |
| 1,956,403 | Scott | Apr. 24, 1934 |
| 2,464,716 | Piton | Mar. 15, 1949 |
| 2,477,688 | Dyer | Aug. 2, 1949 |
| 2,539,932 | Schmitz | Jan. 30, 1951 |
| 2,575,726 | Peck | Nov. 20, 1951 |
| 2,589,092 | Kihn | Mar. 11, 1952 |

FOREIGN PATENTS

| | | |
|---|---|---|
| 203 | Great Britain | of 1881 |
| 263,948 | Great Britain | Jan. 10, 1927 |
| 637,280 | Great Britain | May 17, 1950 |
| 648,228 | Great Britain | Jan. 3, 1951 |